(12) United States Patent
Line et al.

(10) Patent No.: US 11,285,853 B1
(45) Date of Patent: Mar. 29, 2022

(54) MODULAR SEATING ASSEMBLY

(71) Applicant: FORD GLOBAL TECHNOLOGIES, LLC, Dearborn, MI (US)

(72) Inventors: Johnathan Andrew Line, Northville, MI (US); Kevin Wayne Preuss, Berkley, MI (US); Sean Bayle West, Monroe, MI (US); Keith Allen Godin, Dearborn, MI (US); Deeptej Kudav, Southgate, MI (US); Robert Charles Shipley, Plymouth, MI (US); David Andree, Commerce Township, MI (US); Laura Bunn, Dearborn Heights, MI (US); Spencer Robert Hoernke, Dundas (CA); Benjamin Yilma, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/128,319

(22) Filed: Dec. 21, 2020

(51) Int. Cl.
| | | |
|---|---|---|
| *A47C 7/00* | (2006.01) | |
| *B60N 2/68* | (2006.01) | |
| *B60N 2/882* | (2018.01) | |
| *B60N 2/879* | (2018.01) | |
| *B60N 2/64* | (2006.01) | |

(52) U.S. Cl.
CPC ............. *B60N 2/882* (2018.02); *B60N 2/686* (2013.01); *B60N 2/879* (2018.02); *B60N 2/64* (2013.01)

(58) Field of Classification Search
CPC ...... B60N 2/68; B60N 2/682; B60N 2205/35; B60N 2/686; B60N 2/005; B60N 2/8828; B60N 2/879; B60N 2/664
See application file for complete search history.

(56) References Cited

U.S. PATENT DOCUMENTS

| | | | | |
|---|---|---|---|---|
| 4,869,551 A | * | 9/1989 | Lathers | B63B 29/04 297/440.1 |
| 5,441,331 A | * | 8/1995 | Vento | B60N 2/10 297/452.33 |
| 5,533,787 A | * | 7/1996 | Xiang | B60N 2/66 297/284.5 |
| 5,609,395 A | * | 3/1997 | Burch | A47C 7/42 297/335 |

(Continued)

*Primary Examiner* — Shin H Kim
(74) *Attorney, Agent, or Firm* — Price Heneveld LLP; Vichit Chea (57) ABSTRACT

A vehicle seating assembly for a motor vehicle having a lower seating structure and a raised seatback include a common lower back panel and closeout assembly comprising an intersecting rear vertical plane and an upper horizontal plane. A plurality of interchangeable upper shroud assemblies having a plurality of design configurations that are received and coupled with the intersecting rear vertical plane and upper horizontal plane of the common lower back panel and closeout assembly, depending on a chosen trim level. Each of the plurality of interchangeable upper shroud assemblies has an identical intersecting forward vertical plane and a lower horizontal plane that mount to the intersecting rear vertical plane and upper horizontal plane of the common lower back panel and closeout assembly, thereby allowing interchangeability of the plurality of interchangeable upper shroud assemblies to change an overall configuration of the vehicle seating assembly.

19 Claims, 7 Drawing Sheets

(56) References Cited

U.S. PATENT DOCUMENTS

| | | | |
|---|---|---|---|
| 6,199,252 B1 | 3/2001 | Masters et al. | |
| 6,817,673 B2 * | 11/2004 | Walker | B60N 2/002 |
| | | | 297/440.2 |
| 6,827,407 B2 | 12/2004 | Niederman et al. | |
| 7,040,707 B2 * | 5/2006 | Nakahara | B60N 2/5621 |
| | | | 297/396 |
| 7,077,478 B2 * | 7/2006 | Nakamura | B60N 2/68 |
| | | | 297/440.15 |
| 7,748,788 B2 * | 7/2010 | Yumoto | B60N 2/2806 |
| | | | 297/452.42 |
| 8,261,683 B2 | 9/2012 | Knoblett et al. | |
| 8,876,206 B2 * | 11/2014 | Yamaguchi | B60N 2/4228 |
| | | | 297/230.12 |
| 9,469,400 B1 | 10/2016 | Irmen | |
| 9,718,387 B2 * | 8/2017 | LIne | B60N 2/68 |
| 10,391,910 B2 * | 8/2019 | Line | B60N 2/682 |
| 10,576,854 B2 * | 3/2020 | Kondrad | B60N 2/68 |
| 10,882,432 B1 * | 1/2021 | Bosen | B60N 2/986 |
| 2003/0151294 A1 | 8/2003 | Glater | |
| 2003/0197413 A1 * | 10/2003 | Walker | B60N 2/3097 |
| | | | 297/452.19 |
| 2017/0036577 A1 * | 2/2017 | Line | B60N 2/66 |

\* cited by examiner

MODULAR SEATING ASSEMBLY

FIELD OF THE INVENTION

The present invention generally relates to an apparatus and method for improving the appearance and functionality of a seating assembly for a motor vehicle and, more particularly, to a vehicle seating assembly having a modular raised seatback to provide an adaptable and flexible vehicle seating assembly configuration.

BACKGROUND OF THE INVENTION

Vehicle seating assemblies typically include a horizontal seating support and a generally upright raised seatback. Traditionally, both the horizontal seating support and generally upright raised seatback include a foam member that is covered in fabric or leather and are provided with varying levels of finishes and features, ranging from a base model configuration to a luxury model configuration. Accordingly, there is a need to have a vehicle seating assembly that offers multiple configurations, yet provides adequate support to a user for extended periods of time when travelling, that is simple to assemble and aesthetically pleasing.

SUMMARY OF THE INVENTION

According to one aspect of the present invention, a vehicle seating assembly for a motor vehicle having a lower seating structure and a raised seatback comprises a raised seatback having a common lower back panel and closeout assembly comprising an intersecting rear vertical plane and an upper horizontal plane and a plurality of interchangeable upper shroud assemblies having a plurality of design configurations that are received and coupled with the intersecting rear vertical plane and upper horizontal plane of the common lower back panel and closeout assembly, wherein each of the plurality of interchangeable upper shroud assemblies are adapted to define a selectable raised seatback configuration depending on a chosen trim level. Each of the plurality of interchangeable upper shroud assemblies has an identical intersecting forward vertical plane and a lower horizontal plane that mount to the intersecting rear vertical plane and upper horizontal plane of the common lower back panel and closeout assembly, thereby allowing interchangeability of the plurality of interchangeable upper shroud assemblies to change an overall configuration of the vehicle seating assembly.

Embodiments of the first aspect of the present disclosure can include any one or a combination of the following features:

A surface geometry of the forward vertical plane and lower horizontal plane of the plurality of interchangeable upper shroud assemblies exactly corresponds to an inverse surface geometry of the intersecting rear vertical plane and upper horizontal plane of the common lower back panel and closeout assembly The intersecting rear vertical plane and the upper horizontal plane are substantially perpendicular to one another.

The raised seatback comprises one of a plurality of forward soft trim carriers attached to a forward portion of the common lower back panel and closeout assembly, wherein the one of the plurality of forward soft trim carriers is at least partially covered by a flexible covering.

Each of the plurality of forward soft trim carriers comprises a common rearward surface common to all of the plurality of forward soft trim carriers.

The flexible covering comprises any of a woven or nonwoven fabric, vinyl or leather.

The one of the plurality of forward soft trim carriers further comprises a pair of side bolster wings on each lateral side of the one of the plurality of forward soft trim carriers.

The intersecting rear vertical plane and upper horizontal plane of the common lower back panel and closeout assembly define a common mating surface to each of the plurality of interchangeable upper shroud assemblies.

The common lower back panel and closeout assembly comprises a common airbag.

The plurality of interchangeable upper shroud assemblies comprises a base trim level and a high content trim level.

A one of a plurality of headrest module modules is attached to a one of the plurality of interchangeable upper shroud assemblies.

The plurality of headrest modules comprises a manual headrest module and a powered headrest module.

According to another aspect of the present invention, a raised seatback for a vehicle seating assembly, the raised seatback comprises a common lower back panel and closeout assembly comprising a rear vertical plane and an upper horizontal plane intersecting and substantially perpendicular to the rear vertical plane, and a plurality of interchangeable upper shroud assemblies each of which are adapted to be received and coupled with the intersecting rear vertical plane and upper horizontal plane of the common lower back panel and closeout assembly. Each of the plurality of interchangeable upper shroud assemblies has an identical forward vertical plane and a lower horizontal plane planes intersecting and substantially perpendicular to the forward vertical plane that mount to the intersecting rear vertical and upper horizontal planes of the common lower back panel and closeout assembly, thereby allowing interchangeability of the plurality of interchangeable upper shroud assemblies to change an overall configuration of the raised seatback.

Embodiments of the second aspect of the present disclosure can include any one or a combination of the following features:

Each of the plurality of interchangeable upper shroud assemblies comprises a headrest attached thereto above the intersecting forward vertical plane and lower horizontal plane that mount to the intersecting rear vertical plane and upper horizontal plane of the common lower back panel and closeout assembly.

The headrest projects forward of the rear vertical plane of the common lower back panel and closeout assembly.

A one of the plurality of interchangeable upper shroud assemblies comprises a powered headrest module.

A one of the plurality of interchangeable upper shroud assemblies comprises a forward cowl portion and a rearward cowl portion that extend above the common lower back panel and closeout assembly.

A one of the plurality of interchangeable upper shroud assemblies comprises internal speakers disposed on the forward cowl portion, wherein the internal speakers and a speaker enclosure behind the internal speakers are raised above the common lower back panel and closeout assembly and on either side of a headrest module such that the internal speakers are disposed proximate an ear of an occupant of the vehicle seating assembly.

According to yet another aspect of the present invention, a method is disclosed for assembling a vehicle seating assembly for a motor vehicle having a lower seating structure and a raised seatback. The method comprising the steps of providing a common lower back panel and closeout assembly adapted for attachment to a plurality of interchangeable upper shroud configurations, wherein the common lower back panel and closeout assembly defines a rear vertical plane and an upper horizontal plane intersecting and substantially perpendicular to the rear vertical plane; selecting one of a plurality of interchangeable upper shroud assemblies, each of which are adapted to be received and coupled with the intersecting rear vertical plane and upper horizontal plane of the common lower back panel and closeout assembly, wherein each of the plurality of interchangeable upper shroud assemblies has an identical forward vertical plane and a lower horizontal plane planes intersecting and substantially perpendicular to the forward vertical plane that mount to the intersecting rear vertical plane and upper horizontal plane of the common lower back panel and closeout assembly; and interchangeably attaching one of the plurality of interchangeable upper shroud assemblies to the common lower back panel and closeout assembly to define a selectable raised seatback configuration depending on a chosen trim level.

Embodiments of the third aspect of the present disclosure can include any one or a combination of the following features:

The steps of selecting one of a plurality of forward soft trim carriers, each of which is at least partially covered by a flexible covering and adapted to be received and coupled with a common forward portion of the common lower back panel and closeout assembly; and interchangeably attaching one of the plurality of forward soft trim carriers to the common forward portion of the common lower back panel and closeout assembly to define a selectable raised seatback configuration depending on a chosen trim level.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
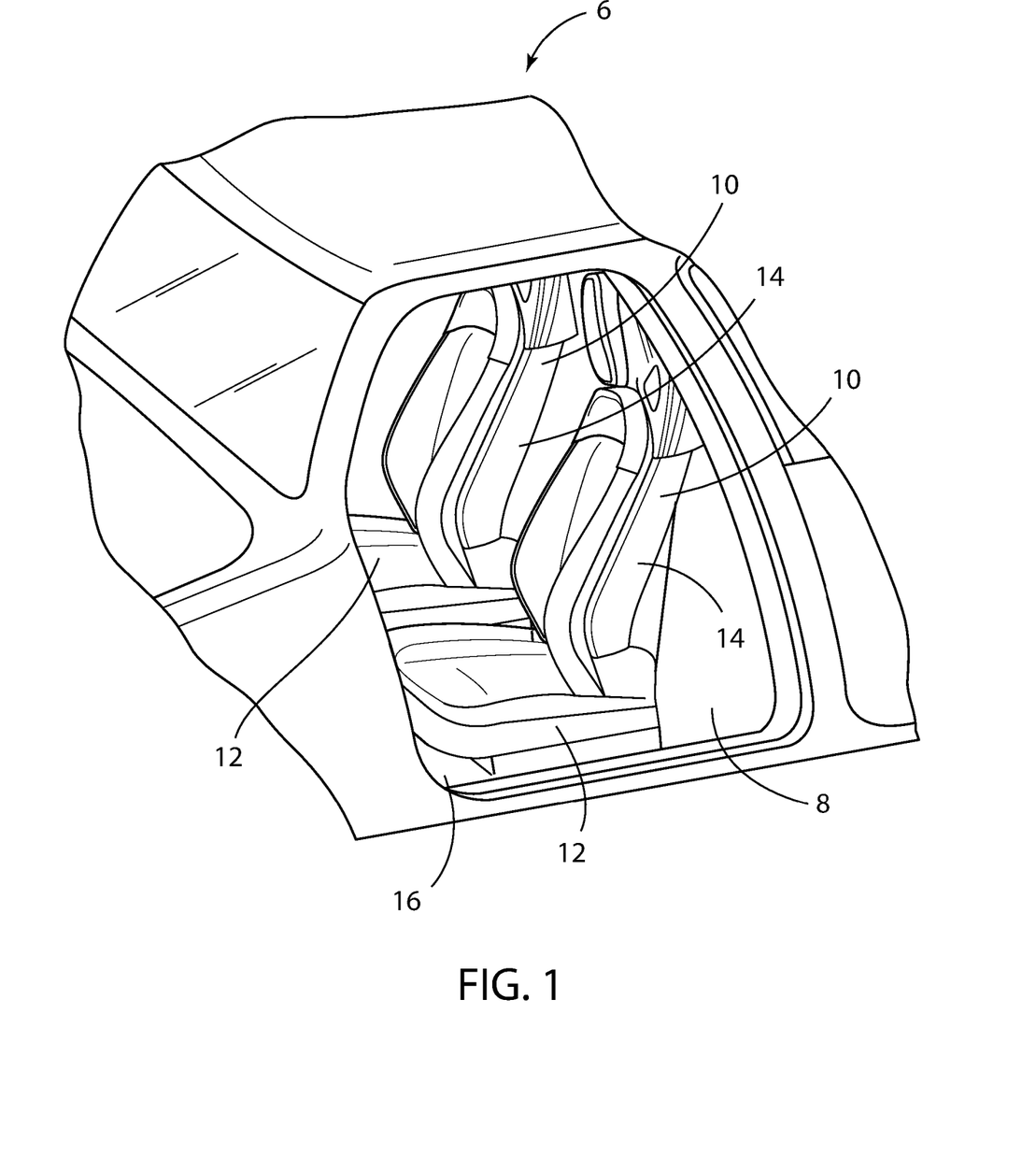
FIG. 1 is a perspective view of a motor vehicle equipped with a seating assembly having a raised seatback in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a vehicle seating assembly for use in a vehicle occupant compartment 8 of an automotive vehicle 6. The vehicle seating assembly 10 includes a lower seating structure 12 pivotably coupled to a raised seatback 14. The vehicle seating assembly 10 is generally configured for use in a variety of vehicles 6 as a front driver seat, a front passenger seat, or a second or third row seat of the vehicle 6 and generally includes the aforementioned lower seating structure 12 and raised seatback 14. The vehicle seating assembly 10 may be configured to be mounted on a support surface, such as a floor pan 16 of the vehicle 6.

As customers are seeking new adaptable and flexible vehicle seating assemblies, simplified designs are required enhance comfort and achieve the needs for entertainment and convenience in the interior compartment, aesthetics, comfort, and utility. Vehicle seating assembly structural and mechanical flexibility are provided by the present disclosure to provide maximized comfort and functional needs. The design is also modular to allow for ease of assembly of seat structures and differentiation of seating assembly configurations. Such modularity enables integrated seat final assembly to reduce complexity for features and trimming solutions.

As perhaps best shown in FIGS. 4-8, and further explained below, these needs are met by the raised seatback 14 that defines a specific and common mating surface to enable a modular vehicle seating assembly 10 design and the ready ability to scale the vehicle seating assembly 10 design from a base level up to and including a high content (or luxury) level, all with minimal impact to the overall seat design, including forward soft trim coverings and foam, comfort shape and contours, safety features, and dimensional requirements which are common to all variants of the raised seatback 14. This allows for better craftsmanship, lower component complexity, lower overall seating assembly cost, and unique styling opportunities.

The raised seatback 14 generally may include one of a plurality of forward soft trim carriers 18, a common lower back panel and closeout assembly 20 mounted to a frame structure (not shown) of the vehicle seating assembly 10, and one of a plurality of interchangeable upper shroud assemblies 22.

Each of the plurality of forward soft trim carriers 18 has a forward side 24 and a common rearward surface 26. The forward side 24 of each the plurality of forward soft trim carriers 18 may include a forward soft trim covering 28 that defines a forward soft trim structure upon which an occupant may be supported on the vehicle seating assembly 10. The forward soft trim covering 28 of each of the plurality of forward soft trim carriers 18 may comprise a flexible covering that at least partially covers the forward side 24 of each the plurality of forward soft trim carriers 18. The flexible covering may comprise any of a woven or nonwoven fabric, vinyl, or leather. In the case of a base level forward soft trim carrier 18, the flexible covering may be a fabric, while in the case of a luxury level forward soft trim carrier 18, the flexible covering may be leather.

The common rearward surface 26 of the plurality of forward soft trim carriers 18 may be attached to a forward portion 32 of the common lower back panel and closeout assembly 20. That is, the common rearward surface 26 of each of the plurality of forward soft trim carriers 18 is common to all the plurality of forward soft trim carriers 18, regardless of the forward soft trim module level. Also, all brackets and motors mounted with the seatback 14 may be common, regardless of the trim level of the plurality of forward soft trim carriers 18. For example, the common lower back panel and closeout assembly 20 may comprise a common airbag. In addition, a pair of side bolster wings 34 may be disposed on each lateral side of each of the plurality of forward soft trim carriers 18, also having a common rearward surface 36.

The common lower back panel and closeout assembly 20 is thus applicable to all configurations of the vehicle seating assembly 10, and is intended to attach to each of the plurality of forward soft trim carriers 18 and to each of the plurality of interchangeable upper shroud assemblies 22 to define the raised seatback 14 having one of a plurality of possible configurations. That is, the forward portion 32 of the common lower back panel and closeout assembly 20 are identical for all configuration. The common lower back panel and closeout assembly 20 may be fabricated from a relative rigid polymer, such as thermoplastic polyolefin (TPO), and may include a map pocket on a rear surface 38 thereof.

Figures 2, 3:
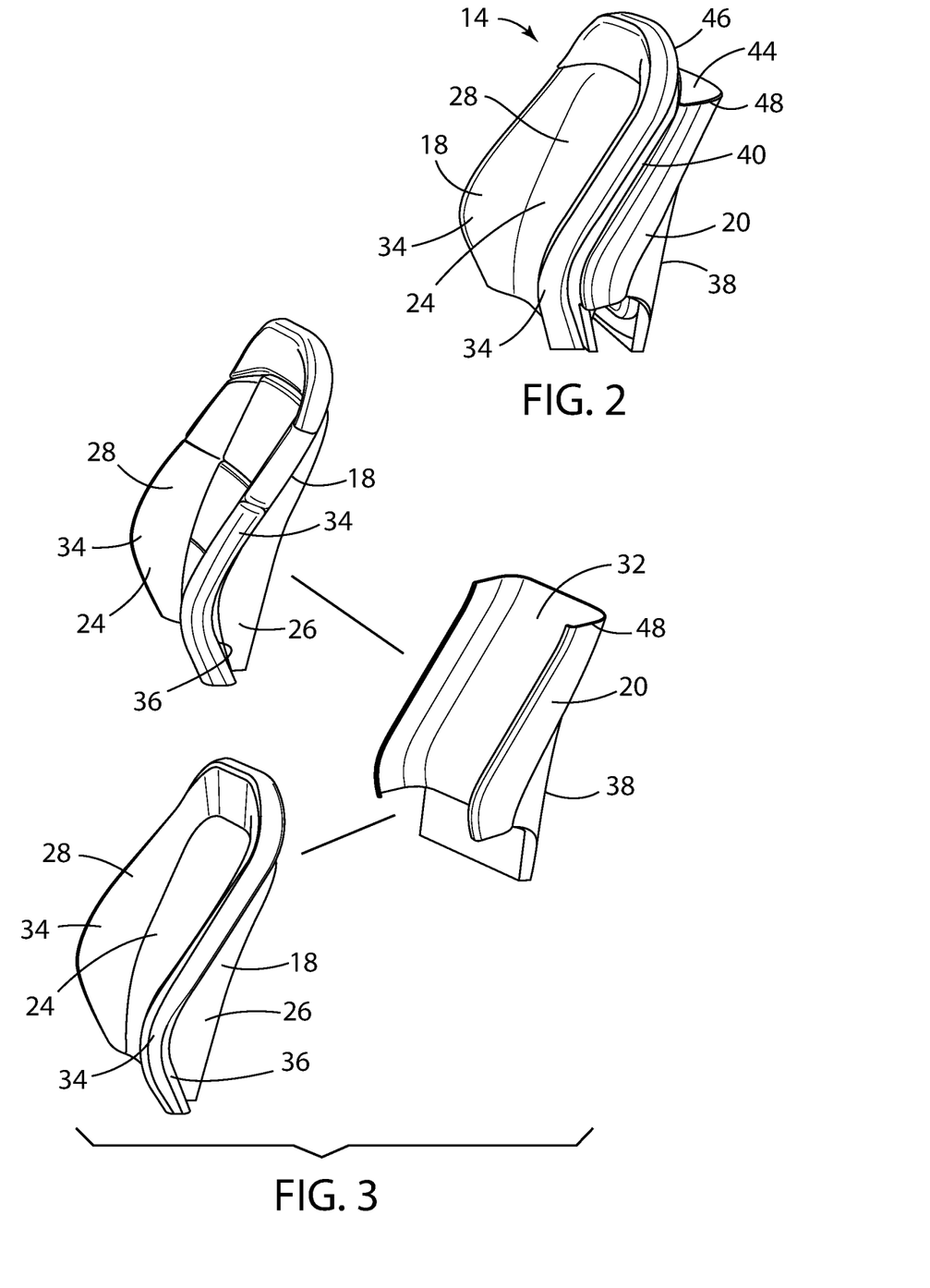
FIG. 2 is a perspective view of the common lower back panel and closeout assembly in accordance with the present disclosure depicted in FIG. 1.
FIG. 3 is a perspective view of a plurality of forward soft trim carriers and the common lower back panel and closeout assembly in accordance with the present disclosure depicted in FIG. 1.

As shown in FIG. 3, one of the plurality of forward soft trim carriers 18, for example, either a base level trim or an luxury level trim, may be attached to the forward portion 32 of the common lower back panel and closeout assembly 20 via a common interface 40 between the common rearward surface 26 of the forward soft trim module and the forward portion 32 of the common lower back panel and closeout assembly 20 to define a portion of the raised seatback 14. This arrangement allows for better craftsmanship, lower overall seat cost, and unique styling opportunities. The common interface 40 may include an interlocking interface, such as via bayonet fasteners or hook and loop fasteners, for ease of assembly and serviceability.

Figure 8:
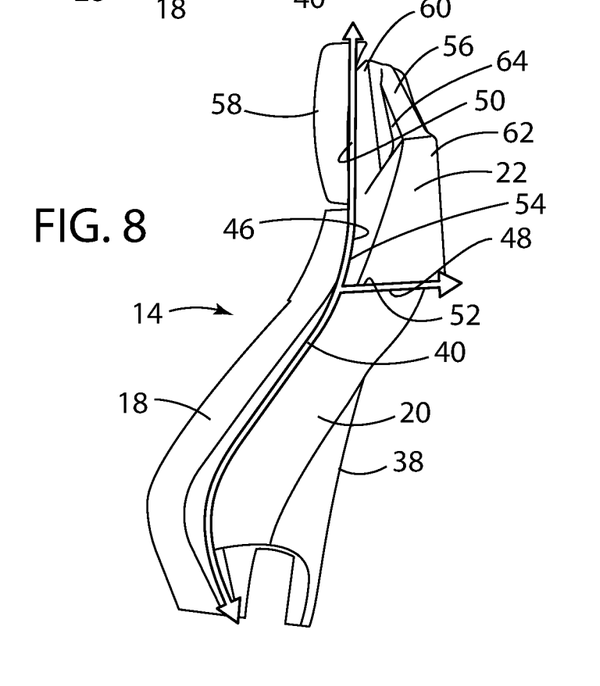
FIG. 8 is a schematic side view of the upper portion of the common lower back panel and closeout assembly and one of the plurality of interchangeable upper shroud assemblies in accordance with the present disclosure depicted in FIG. 1.
Figure 9:
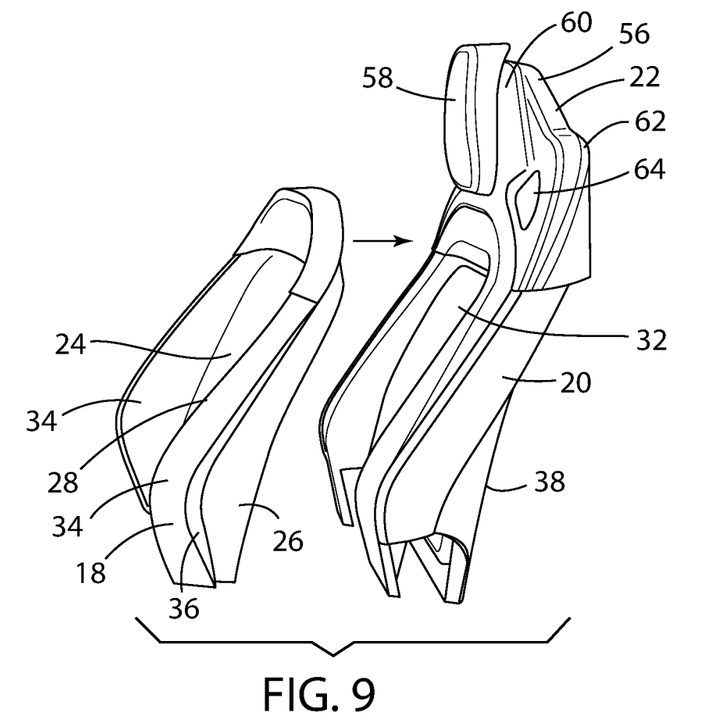
FIG. 9 is a perspective exploded view of one of the plurality of forward soft trim carriers, the common lower back panel and closeout assembly, and one of the plurality of interchangeable upper shroud assemblies in accordance with the present disclosure depicted in FIG. 1.

The common lower back panel and closeout assembly 20 may also include a back panel split 44, thus allowing all configurations of the raised seatback 14 to utilize the single common lower back panel and closeout assembly 20, while also allowing the use of any of the plurality of interchangeable upper shroud assemblies 22 to obtain all trim levels. The back panel split 44 may include an intersecting pair of planes. More specifically, the back panel split 44 may include an intersecting rear vertical plane 46 and an upper horizontal plane 48 on the common lower back panel and closeout assembly 20. As shown in FIG. 8, the intersecting rear vertical plane 46 and the upper horizontal plane 48 are substantially perpendicular to one another. The back panel split 44 separates the common lower back panel and closeout assembly 20 from the plurality of interchangeable shroud assemblies 22 that are received and coupled with the intersecting rear vertical plane 46 and upper horizontal plane 48 of the common lower back panel and closeout assembly 20, thus allowing various features and components for a variety of trim level finished seating assemblies, as well as interchangeability between first and second row seating positions.

Figures 4, 5:
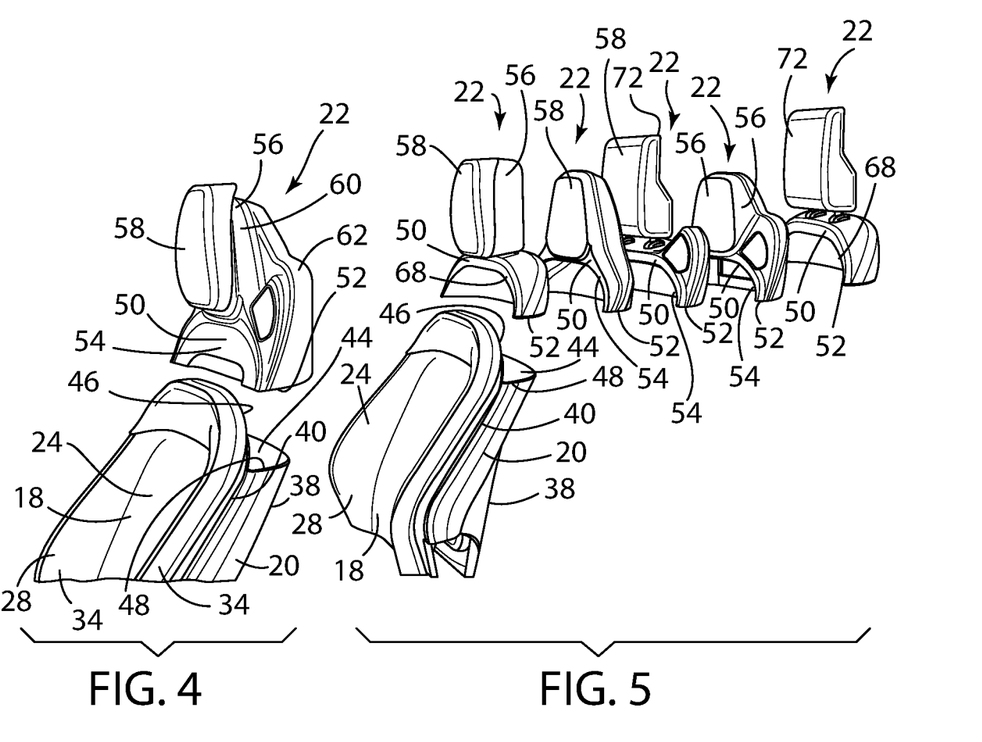
FIG. 4 is a perspective view of an upper portion of the common lower back panel and closeout assembly and one of the plurality of interchangeable upper shroud assemblies in accordance with the present disclosure depicted in FIG. 1.
FIG. 5 is a perspective view of the upper portion of the common lower back panel and closeout assembly and several of the plurality of interchangeable upper shroud assemblies in accordance with the present disclosure depicted in FIG. 1.

As shown in FIGS. 4-6, the plurality of interchangeable upper shroud assemblies 22 have a plurality of design configurations that are received and coupled with the intersecting rear vertical plane 46 and upper horizontal plane 48 of the common lower back panel and closeout assembly 20, whereby each of the plurality of interchangeable upper shroud assemblies 22 are adapted to define a selectable configuration of the raised seatback 14 depending on a chosen trim level. That is, the plurality of interchangeable upper shrouds 22 allows for a plurality of design configurations, depending on a desired trim level, row, and vehicle 6 program.

Accordingly, unique interchangeable upper shrouds 22 may be developed based on trim level, row, feature content needs, and vehicle 6 program considerations, enabling the vehicle seating assembly 10 to adopt designs that scale from entry-level to highest-content feature levels with minimal impact to the overall seat design no matter what the application requires. The base level and luxury level interchangeable upper shroud assemblies 22 may also be adapted for second or third seating row vehicle seating assemblies 10.

Each of the plurality of interchangeable upper shroud assemblies 22 has identical intersecting forward vertical plane 50 and lower horizontal plane 52 that are a mirror image of and mount to the intersecting rear vertical plane 46 and upper horizontal plane 48 of the common lower back panel and closeout assembly 20, thereby allowing interchangeability of the plurality of interchangeable upper shroud assemblies 22 to change an overall configuration of the vehicle seating assembly 10. The surface geometry of the forward vertical plane 50 and lower horizontal plane 52 of the plurality of interchangeable upper shroud assemblies 22 exactly corresponds to an inverse surface geometry of the intersecting rear vertical plane 46 and upper horizontal plane 48 of the common lower back panel and closeout assembly 20.

Although interchangeable, the plurality of interchangeable upper shroud assemblies 22 may have a plurality of radically different design configurations that are received and coupled with the intersecting rear vertical plane 46 and upper horizontal plane 48 of the common lower back panel and closeout assembly 20, wherein each of the plurality of interchangeable upper shroud assemblies 22 are adapted to define a selectable raised seatback 14 configuration depending on a chosen trim level. All interchangeable upper shroud assemblies 22 share a common configuration for attachment to the raised seatback 14. That is, each of the interchangeable upper shroud assemblies 22 have a common front and lower portion 54 for attachment to the back panel split 44 of the common lower back panel and closeout assembly 20. Thus, the plurality of interchangeable upper shroud assemblies 22 may include a variety of different interchangeable upper shroud embodiments 22 that differ in appearance and construction.

Figure 6A:
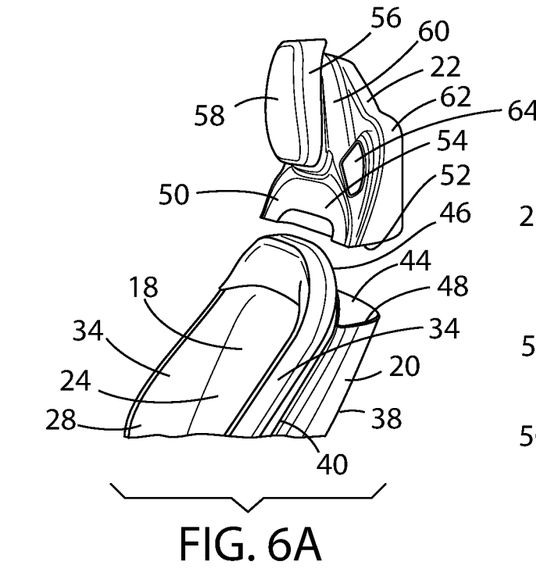
FIGS. 6A-6F are perspective views of the plurality of interchangeable upper shroud assemblies in accordance with the present disclosure depicted in FIG. 1.
Figure 10:
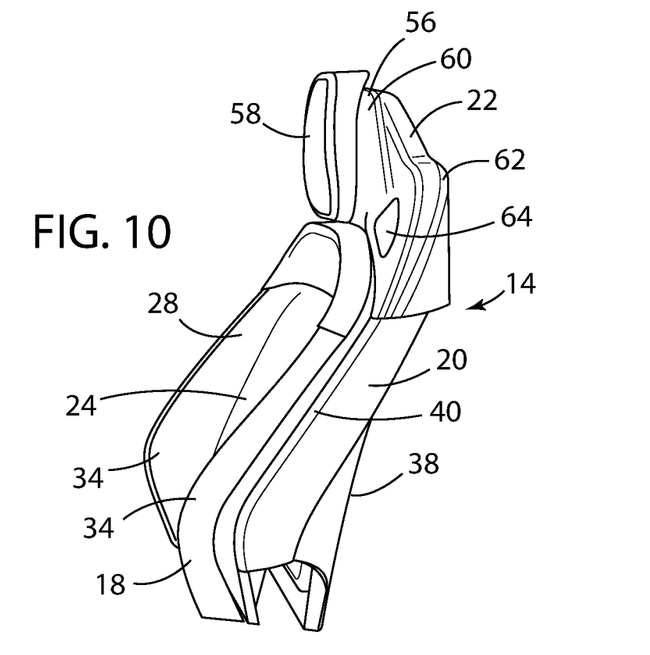
FIG. 10 is a perspective view the raised seatback in accordance with the present disclosure depicted in FIG. 1.
Figure 11:
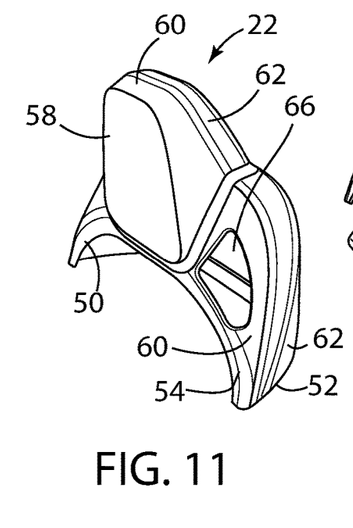
FIG. 11 is a perspective view of two of the plurality of interchangeable upper shroud assemblies in accordance with the present disclosure depicted in FIG. 1.
Figure 12:
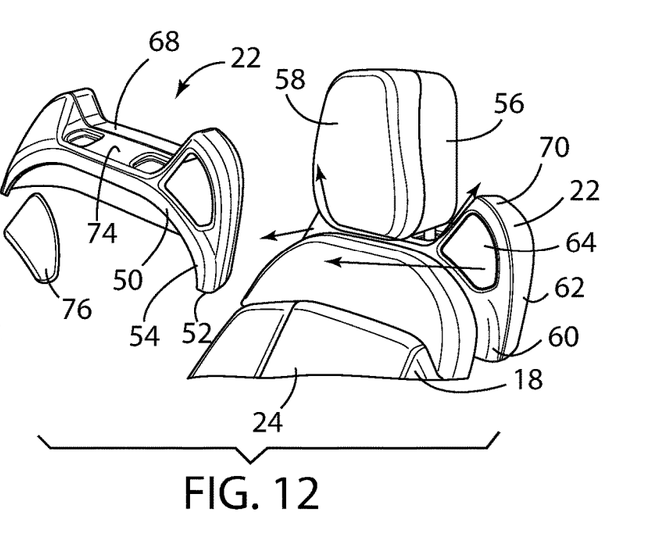
FIG. 12 is a perspective view of one of the plurality of interchangeable upper shroud assemblies in accordance with the present disclosure depicted in FIG. 1.

For example, FIGS. 4 and 6A show a first embodiment of one of the plurality of interchangeable upper shroud assemblies 22 for a luxury level first seating row vehicle seating assembly 10 having a power headrest module 56. The power headrest module 56 may include a powered four-way headrest 58 attached to a forward cowl portion 60 above the intersecting forward vertical and lower horizontal planes 50, 52 that mount to the intersecting rear vertical and upper horizontal planes 46, 48 of the common lower back panel and closeout assembly 20. As shown in FIG. 10, the headrest 58 of the powered headrest module 56 may project forward of the rear vertical plane 46 of the common lower back panel and closeout assembly 20. The first embodiment may also include the forward cowl portion 60 and a rearward cowl portion 62 injection molded from a rigid polymer that may be snapped or clipped together as mating clamshells and extend above the common lower back panel and closeout assembly 20. The forward cowl portion 60 and the rearward cowl portion 62 may also extend laterally on both sides and support the powered headrest module 56.

In addition, internal speakers 64 may be provided on the forward cowl portion 60, as shown in FIGS. 4 and 6A. As shown, the internal speakers 64 and the speaker enclosure 66 behind it are raised above the common lower back panel and closeout assembly 20 and on either side of the powered headrest module 56 such that the internal speakers 64 are disposed proximate the ears of the occupant of the vehicle seating assembly 10. This feature may be provided on both first and second row seating positions, providing a unique benefit of the plurality of interchangeable upper shroud assemblies 22.

Figure 6B:
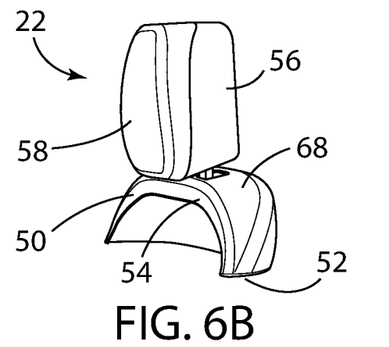

A second embodiment of one of the plurality of interchangeable upper shroud assemblies 22 is shown in FIGS. 5 and 6B and may include a simple integrated injection molded cowling 68 attached at its intersecting forward vertical plane 50 and lower horizontal plane 52 to the intersecting rear vertical plane 46 and upper horizontal plane 48 of the common lower back panel and closeout assembly 20. The powered headrest module 56 may also include a powered four-way headrest 58 attached to interchangeable upper shroud assembly 22 above the intersecting forward vertical and lower horizontal planes 50, 52 that mount to the intersecting rear vertical and upper horizontal planes 46, 48 of the common lower back panel and closeout assembly 20.

Figure 6C:
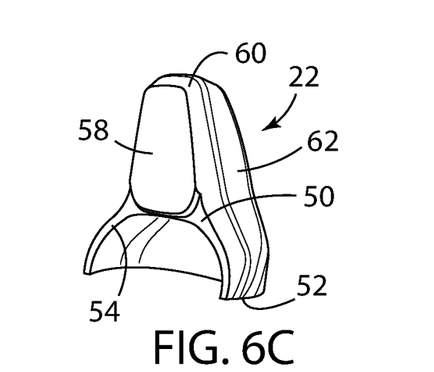
Figure 6D:
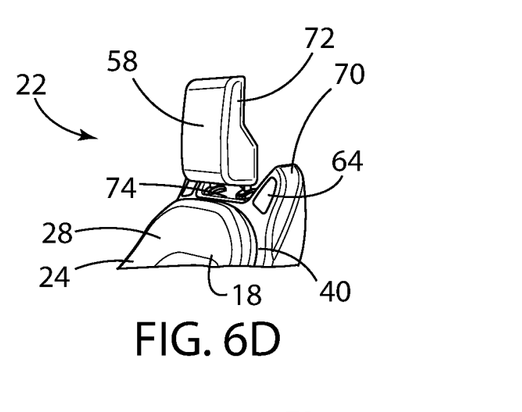

A third embodiment of one of the plurality of interchangeable upper shroud assemblies 22 may include the upwardly extending forward cowl portion 60 and the rearward cowl portion 62, attached to one another, and attached at their intersecting forward vertical and lower horizontal planes 50, 52 to the intersecting rear vertical and upper horizontal planes 46, 48 of the common lower back panel and closeout assembly 20. As shown in FIGS. 5 and 6C, in the third embodiment, the forward cowl portion 60 and the rearward cowl portion 62 may be injection molded from a rigid polymer and be snapped or clipped together. A fixed headrest 58 may be incorporated onto the forward cowl portion 60 of the third configuration that extends above the common lower back panel and closeout assembly 20.

Figure 13:
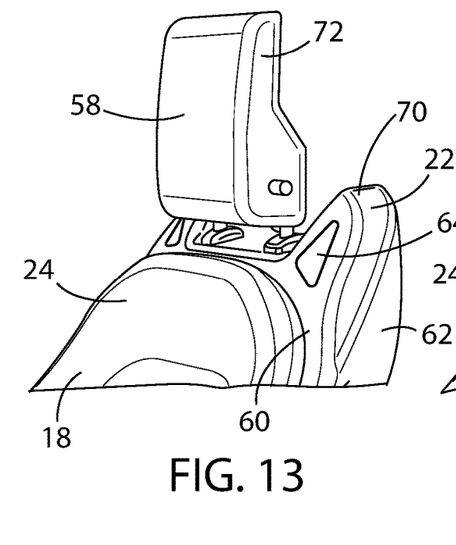
FIG. 13 is a perspective view of one of the plurality of interchangeable upper shroud assemblies with a manual headrest module in a first position in accordance with the present disclosure depicted in FIG. 1.
Figure 14:
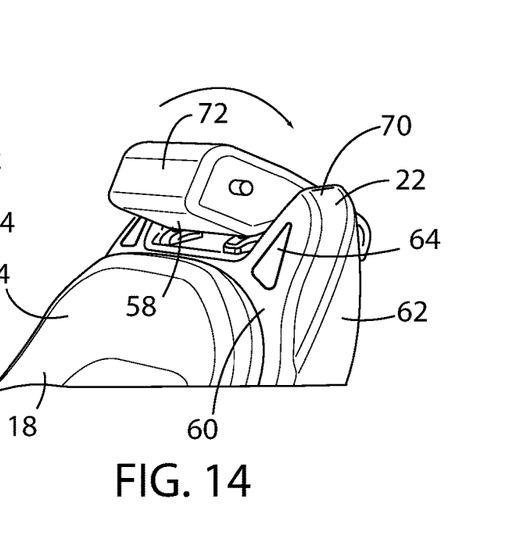
FIG. 14 is a perspective views of one of the plurality of interchangeable upper shroud assemblies with a manual headrest module in a second position in accordance with the present disclosure depicted in FIG. 13.

A fourth embodiment of one of the plurality of interchangeable upper shroud assemblies 22 may also include the upwardly extending forward cowl portion 60 and the rearward cowl portion 62, attached to one another, and attached at their intersecting forward vertical and lower horizontal planes 50, 52 to the intersecting rear vertical and upper horizontal planes 46, 48 of the common lower back panel and closeout assembly 20. As shown in FIGS. 5, 6D, 13, and 14, the third configuration includes the forward cowl portion 60 and the rearward cowl portion 62 clipped together. A pair of upwardly extending wings 70 disposed on each lateral side of the cowl portions 60, 62 may be provided with internal speakers 64, similar to those described above and as shown in FIGS. 5, 6D, 13, and 14. A manual two-way headrest module 72 may be mounted into an upper portion 74 of the fourth configuration interchangeable upper shroud assembly 22 to extend above the common lower back panel and closeout assembly 20, as shown in FIGS. 13 and 14. As shown, clearance between the pair of upwardly extending wings 70 is provided for the rearward flipping motion of the manual two-way headrest module 72.

Figure 6E:
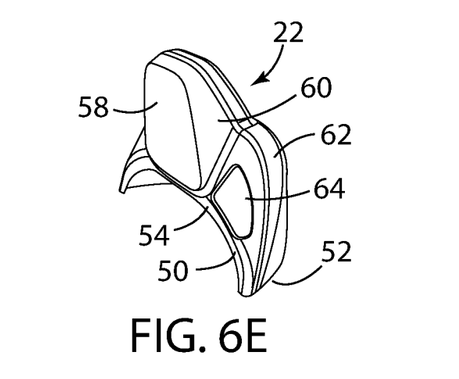

A fifth embodiment, representing a sport trim level of one of the plurality of interchangeable upper shroud assemblies 22, shown in FIGS. 5 and 6E, may also include an integral fixed headrest 58 attached onto the forward cowl portion 60 above the intersecting forward vertical and lower horizontal planes 50, 52 that mount to the intersecting rear vertical and upper horizontal planes 46, 48 of the common lower back panel and closeout assembly 20. As shown in FIGS. 5 and 6E, the third configuration includes a forward cowl portion 60 and a rearward cowl portion 62 that may be snapped or clipped together. The fixed headrest 58 may project forward of the rear vertical plane 46 of the common lower back panel and closeout assembly 20. The forward cowl portion and rearward cowl portions 60, 62 of the fifth embodiment extend above the common lower back panel and closeout assembly 20, extend laterally on both sides, and may be provided with internal speakers 64. The rearward cowl portion 62 conforms to the outline of the fixed headrest 58.

Figure 6F:
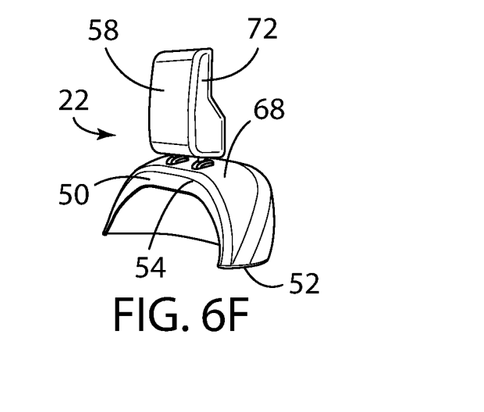
Figure 7:
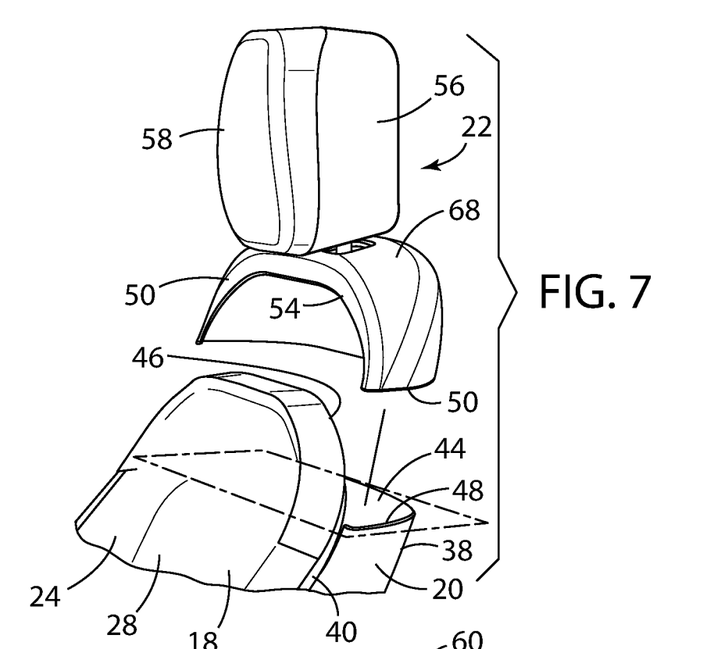
FIG. 7 is a perspective view of an upper portion of the common lower back panel and closeout assembly and one of the plurality of interchangeable upper shroud assemblies in accordance with the present disclosure depicted in FIG. 1.

Finally, FIG. 6F shows a sixth embodiment of one of the plurality of interchangeable upper shroud assemblies 22 for a base level first seating row vehicle seating assembly 10. The base level may also include a simple integrated injection molded cowling 68 defining its intersecting forward vertical and lower horizontal planes 50, 52 and allowing its attachment to the intersecting rear vertical and upper horizontal planes 46, 48 of the common lower back panel and closeout assembly 20, as shown in FIGS. 5 and 6F. A manual two-way headrest module 72 may be mounted onto an upper portion 74 of the sixth configuration to extend above the common lower back panel and closeout assembly 20, similar to the manual headrest module 72 shown in FIGS. 13 and 14.

Assembly of the aforementioned vehicle seating assembly 10 is obtained by providing the common lower back panel and closeout assembly 20, wherein the common closeout and back panel and closeout assembly 20 defines the rear vertical plane 46 and the upper horizontal plane 48 intersecting and substantially perpendicular to the rear vertical plane 46. Next, one of the plurality of forward soft trim carriers 18 is selected, each of which is at least partially covered by a flexible forward soft trim covering 28 and adapted to be received and coupled with the forward portion 32 of the common lower back panel and closeout assembly 20. The selected forward soft trim carrier 18 is then interchangeably attached to the forward portion 32 of the common lower back panel and closeout assembly 20.

Next, one of the plurality of interchangeable upper shroud assemblies 22 is selected, each of which are adapted to be received and coupled with the intersecting rear vertical and upper horizontal planes 46, 48 of the common lower back panel and closeout assembly 20, wherein each of the plurality of interchangeable upper shroud assemblies 22 has an identical forward vertical plane 50 and a lower horizontal plane 52 intersecting and substantially perpendicular to the forward vertical plane 50 that mount to the intersecting rear vertical and upper horizontal planes 46, 48 of the common lower back panel and closeout assembly 20. Finally, the selected interchangeable upper shroud assembly 22 is then interchangeably attached to the common lower back panel and closeout assembly 20 to define a selectable raised seatback 14 configuration depending on a chosen trim level.

The attachment of each of the plurality of interchangeable upper shroud assemblies 22 to the common lower back panel and closeout assembly 20 may be obtained with known fastening devices and techniques, and may be directly or indirectly coupled to the frame of the vehicle seating assembly 10. Each of the plurality of interchangeable upper shroud assemblies 22 having a forward cowl portion 60 and a rearward cowl portion 62 may be configured such that that its intersecting forward vertical and lower horizontal planes 50, 52 are adapted to fit with and attach to the intersecting rear vertical and upper horizontal planes 46, 48 of the common lower back panel and closeout assembly 20.

Also, for the higher trim level finishes that incorporate internal speakers 64, the speaker grill surface 76 may be common to each of the plurality of interchangeable upper shroud assemblies 22. By so doing, a common speaker enclosure 66 and structure may be obtained for both first row and second row vehicle seating assemblies 10, thus providing the same high quality sound in all seating positions, regardless of first or second row position.

As noted above, an advantageous feature of the plurality of interchangeable upper shroud assemblies 22 is that a first row raised seatback 14 may be readily incorporated into a second row raised seatback 14, allowing for a true first row experience in the second row. In this case, the back panel split 44 may be adapted to accommodate the need for a child seat anchor.

Thus, the vehicle seating assembly 10 of the present disclosure provides an assembly wherein a common lower back panel and closeout assembly 20 may be coupled to a plurality of forward soft trim carriers 18 and to a plurality of interchangeable upper shroud assemblies 22 having a plurality of design configurations that are received and coupled with the intersecting rear vertical and upper horizontal planes 46, 48 of the common lower back panel and closeout assembly 20. Each of the plurality of interchangeable upper shroud assemblies 22 has an identical intersecting forward vertical and lower horizontal planes 50, 52 that mounts to the intersecting rear vertical and upper horizontal planes 46, 48 of the common lower back panel and closeout assembly 20, thereby allowing interchangeability of the plurality of forward soft trim carriers 18 and the plurality of interchangeable upper shroud assemblies 22 to fundamentally change the overall configuration of the vehicle seating assembly 10. Since each of the plurality of forward soft trim carriers 18 and the plurality of interchangeable upper shroud assemblies 22 are adapted to define a selectable raised seatback 14 configuration depending on a chosen trim level, a plurality of differing overall vehicle seating assembly 10 configurations may be readily obtained.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A vehicle seating assembly for a motor vehicle having a lower seating structure and a raised seatback, wherein the raised seatback comprises:
   a common lower back panel and closeout assembly comprising an intersecting rear vertical plane and an upper horizontal plane, wherein the intersecting rear vertical plane and the upper horizontal plane are substantially perpendicular to one another; and
   a plurality of interchangeable upper shroud assemblies having a plurality of design configurations that are received and coupled with the intersecting rear vertical plane and upper horizontal plane of the common lower back panel and closeout assembly, wherein each of the plurality of interchangeable upper shroud assemblies are adapted to define a selectable raised seatback configuration depending on a chosen trim level;
   wherein each of the plurality of interchangeable upper shroud assemblies has an identical intersecting forward vertical plane and a lower horizontal plane that mount to the intersecting rear vertical plane and upper horizontal plane of the common lower back panel and closeout assembly, wherein the intersecting forward vertical plane and a lower horizontal plane are substantially perpendicular to one another, thereby allowing interchangeability of the plurality of interchangeable upper shroud assemblies to change an overall configuration of the vehicle seating assembly.

2. The vehicle seating assembly of claim 1, wherein a surface geometry of the forward vertical plane and lower horizontal plane of the plurality of interchangeable upper shroud assemblies exactly corresponds to an inverse surface geometry of the intersecting rear vertical plane and upper horizontal plane of the common lower back panel and closeout assembly.

3. The vehicle seating assembly of claim 1, wherein the raised seatback comprises one of a plurality of forward soft trim carriers attached to a forward portion of the common lower back panel and closeout assembly, wherein the one of the plurality of forward soft trim carriers is at least partially covered by a flexible covering.

4. The vehicle seating assembly of claim 3, wherein each of the plurality of forward soft trim carriers comprises a common rearward surface common to all of the plurality of forward soft trim carriers.

5. The vehicle seating assembly of claim 3, wherein the flexible covering comprises any of a woven or nonwoven fabric, vinyl, or leather.

6. The vehicle seating assembly of claim 3, wherein the one of the plurality of forward soft trim carriers further comprises a pair of side bolster wings on each lateral side of the one of the plurality of forward soft trim carriers.

7. The vehicle seating assembly of claim 1, wherein the intersecting rear vertical plane and upper horizontal plane of the common lower back panel and closeout assembly define a common mating surface to each of the plurality of interchangeable upper shroud assemblies.

8. The vehicle seating assembly of claim 1, wherein the common lower back panel and closeout assembly comprises a common airbag.

9. The vehicle seating assembly of claim 1, wherein the plurality of interchangeable upper shroud assemblies comprises a base trim level and a high content trim level.

10. The vehicle seating assembly of claim 1, wherein one of a plurality of headrest modules is attached to a one of the plurality of interchangeable upper shroud assemblies.

11. The vehicle seating assembly of claim 10, wherein the plurality of headrest module modules comprises a manual headrest module and a powered headrest module.

12. A raised seatback for a vehicle seating assembly, the raised seatback comprising:
   a common lower back panel and closeout assembly comprising a rear vertical plane and an upper horizontal plane intersecting and substantially perpendicular to the rear vertical plane; and
   a plurality of interchangeable upper shroud assemblies each of which are adapted to be received and coupled with the intersecting rear vertical plane and upper horizontal plane of the common lower back panel and closeout assembly;
   wherein each of the plurality of interchangeable upper shroud assemblies has an identical forward vertical plane and a lower horizontal plane planes intersecting and substantially perpendicular to the forward vertical plane that mount to the intersecting rear vertical and upper horizontal planes of the common lower back panel and closeout assembly, thereby allowing interchangeability of the plurality of interchangeable upper shroud assemblies to change an overall configuration of the raised seatback.

13. The raised seatback of claim 12, wherein each of the plurality of interchangeable upper shroud assemblies comprises a headrest attached thereto above the intersecting forward vertical plane and lower horizontal plane that mount to the intersecting rear vertical plane and upper horizontal plane of the common lower back panel and closeout assembly.

14. A raised seatback for a vehicle seating assembly, the raised seatback comprising:
   a common lower back panel and closeout assembly comprising a rear vertical plane and an upper horizontal plane intersecting and substantially perpendicular to the rear vertical plane; and
   a plurality of interchangeable upper shroud assemblies each of which are adapted to be received and coupled with the intersecting rear vertical plane and upper horizontal plane of the common lower back panel and closeout assembly;
   wherein each of the plurality of interchangeable upper shroud assemblies has an identical forward vertical plane and a lower horizontal plane planes intersecting and substantially perpendicular to the forward vertical plane that mount to the intersecting rear vertical and upper horizontal planes of the common lower back panel and closeout assembly, thereby allowing interchangeability of the plurality of interchangeable upper shroud assemblies to change an overall configuration of the raised seatback; and
   wherein the headrest projects forward of the rear vertical plane of the common lower back panel and closeout assembly.

15. The raised seatback of claim 14, wherein one of the plurality of interchangeable upper shroud assemblies comprises a powered headrest module.

16. A raised seatback for a vehicle seating assembly, the raised seatback comprising:

a common lower back panel and closeout assembly comprising a rear vertical plane and an upper horizontal plane intersecting and substantially perpendicular to the rear vertical plane; and a plurality of interchangeable upper shroud assemblies each of which are adapted to be received and coupled with the intersecting rear vertical plane and upper horizontal plane of the common lower back panel and closeout assembly;

wherein each of the plurality of interchangeable upper shroud assemblies has an identical forward vertical plane and a lower horizontal plane planes intersecting and substantially perpendicular to the forward vertical plane that mount to the intersecting rear vertical and upper horizontal planes of the common lower back panel and closeout assembly, thereby allowing interchangeability of the plurality of interchangeable upper shroud assemblies to change an overall configuration of the raised seatback; and wherein one of the plurality of interchangeable upper shroud assemblies comprises a forward cowl portion and a rearward cowl portion that extend above the common lower back panel and closeout assembly.

17. The raised seatback of claim 16, wherein the one of the plurality of interchangeable upper shroud assemblies comprises internal speakers disposed on the forward cowl portion, wherein the internal speakers and a speaker enclosure behind the internal speakers are raised above the common lower back panel and closeout assembly and on either side of a headrest module such that the internal speakers are disposed proximate an ear of an occupant of the vehicle seating assembly.

18. A method of assembling a vehicle seating assembly for a motor vehicle having a lower seating structure and a raised seatback, the method comprising the steps of:

providing a common lower back panel and closeout assembly adapted for attachment to a plurality of interchangeable upper shroud configurations, wherein the common lower back panel and closeout assembly defines a rear vertical plane and an upper horizontal plane intersecting and substantially perpendicular to the rear vertical plane;

selecting one of a plurality of interchangeable upper shroud assemblies, each of which is adapted to be received and coupled with the intersecting rear vertical plane and upper horizontal plane of the common lower back panel and closeout assembly, wherein each of the plurality of interchangeable upper shroud assemblies has an identical forward vertical plane and a lower horizontal plane planes intersecting and substantially perpendicular to the forward vertical plane that mount to the intersecting rear vertical plane and upper horizontal plane of the common lower back panel and closeout assembly; and interchangeably attaching one of the plurality of interchangeable upper shroud assemblies to the common lower back panel and closeout assembly to define a selectable raised seatback configuration depending on a chosen trim level.

19. The method of claim 18, further comprising the steps of:

selecting one of a plurality of forward soft trim carriers, each of which is at least partially covered by a flexible covering and adapted to be received and coupled with a common forward portion of the common lower back panel and closeout assembly; and interchangeably attaching one of the plurality of forward soft trim carriers to the common forward portion of the common lower back panel and closeout assembly to define a selectable raised seatback configuration depending on a chosen trim level.

\* \* \* \* \*